July 14, 1953  G. B. HUNT  2,645,310
BRAKE RIGGING
Filed May 11, 1951

Inventor:
Gerald B. Hunt,
by Ernest C. Britton
His Attorney.

Patented July 14, 1953

2,645,310

UNITED STATES PATENT OFFICE 2,645,310

BRAKE RIGGING

Gerald B. Hunt, Erie, Pa., assignor to General Electric Company, a corporation of New York Application May 11, 1951, Serial No. 225,746

4 Claims. (Cl. 188—33)

This invention relates to brake rigging for rail vehicle trucks and, more particularly, to the clasp type brake rigging.

In the design of certain rail vehicles, for example, diesel-electric locomotives, it is frequently desirable to provide for utilization of the vehicle in more than one class of service, i. e., both passenger and freight. In addition to the numerous other problems which the design of such a dual-purpose locomotive presents, it necessary to provide brake rigging which will furnish different braking efforts for the two types of service, the passenger service usually requiring more braking effort than freight service.

An object of this invention is, therefore, to provide a brake rigging construction which may be readily converted from one braking effort to another.

Further objects and advantages of this invention will be readily apparent and the invention will be more clearly understood by reference to the following description and the accompanying drawing, and the features of the novelty which characterize this invention will be pointed out with particularity in the claims annexed to and forming a part of this specification.

This invention contemplates a brake rigging arrangement for a rail vehicle truck having a side frame member. A fulcrum bracket is removably mounted on the side frame member and adapted to be secured thereto in either a first position or a second position. A fulcrum lever is provided having one end operatively connected to the brake rigging and is pivotally mounted on the fulcrum bracket, the other end of the fulcrum lever being connected to power means mounted on the side frame of the truck. The fulcrum point of the fulcrum bracket is offset from the longitudinal center line thereof so that reversal of the fulcrum bracket changes the distance from the point of the connection between the brake rigging and the fulcrum lever to the fulcrum point. Thus, the braking effort may be changed by reversing the fulcrum bracket and substituting a fulcrum lever having a different fulcrum point.

Figure 1:
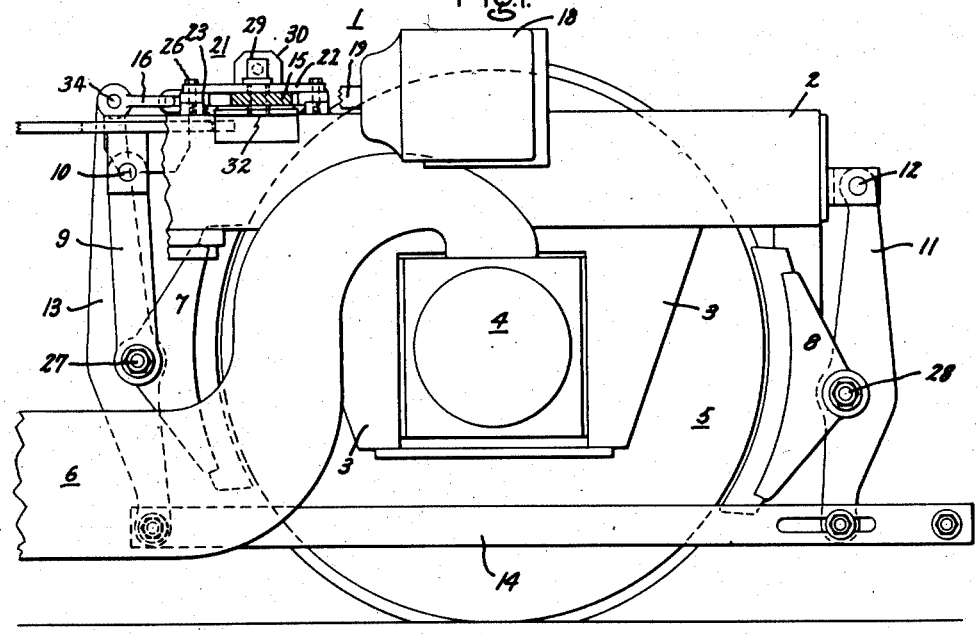
Figure 2:
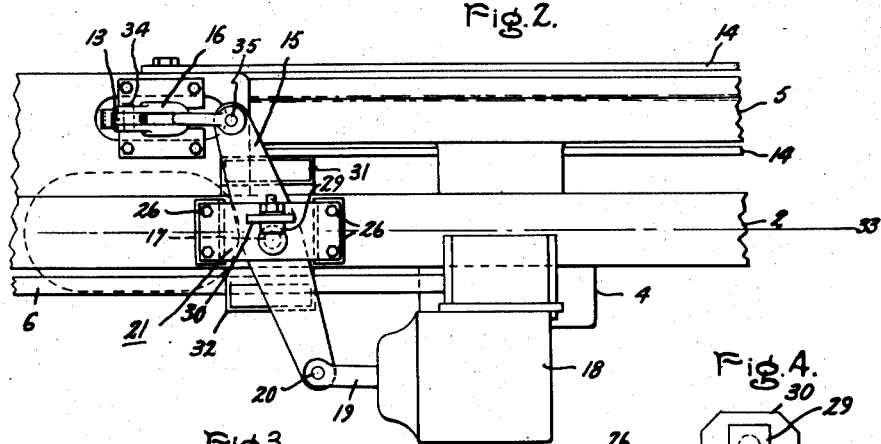
Figure 3:
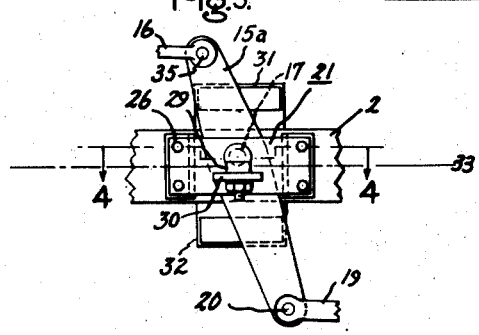
Figure 4:
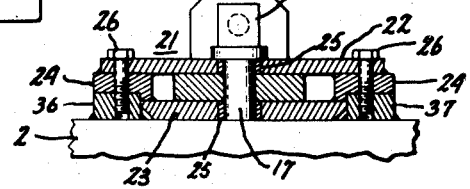

In the drawing, Fig. 1 is a side elevational view, partly broken away, of a portion of a truck provided with the improved brake rigging arrangement of this invention; Fig. 2 is a vertical view of the arrangement of Fig. 1 showing the brake rigging arranged for one braking effort; Fig. 3 is a fragmentary view showing the brake rigging arranged for the other braking effort; and Fig. 4 is a cross-sectional view of the improved fulcrum bracket of this invention taken along the lines 4—4 of Fig. 3.

Referring now to Fig. 1, there is shown a rail vehicle truck 1 having a side frame member 2 with depending bearing pedestals 3 being secured thereto or formed integrally therewith. Journal box 4 supports the axle of wheel 5 and is guided by the pedestals 3. An equalizer 6 connects the journal box 4 and the journal box of the other axle (not shown) with suitable springing (not shown) interconnecting the equalizer and the truck frame.

The brake rigging for the truck 1 is shown as being of the unit clasp type, the assembly cooperating with the wheel 5 including a pair of brake shoes 7 and 8. The brake shoe 7 is supported by two brake hanger levers 9, one each side of brake lever 13, pivotally supported on the side frame member 2, as at 10, pin 27 serving to connect the brake shoe 7, hanger 9 and brake lever 13. The brake shoe 8 is supported by a dead brake lever 11 pivotally supported on the side frame member 2 as at 12, pin 28 connecting the brake shoe 8 to brake lever 11. Live brake lever 13 is also pivotally connected to the brake shoe 7 and hanger levers 9 by pin 27, and the lower extremities of the dead brake lever 11 and the live brake lever 13 are connected by pull rods 14 arranged on each side of wheel 5.

In order to apply the brake shoes 7 and 8, the live brake lever 13 is connected to a fulcrum lever 15 by a clevis 16 and pins 34 and 35, the fulcrum lever 15 being pivoted on the side frame member 2 at 17, as will be hereinafter described. Suitable power means, for example, an air cylinder 18, is mounted on the side frame 2 with its push rod 19 being connected to the fulcrum lever 15 as at 20.

In order to provide for mounting the fulcrum lever 15 on the side frame 2, a fulcrum bracket assembly 21 is provided including a top plate 22, a bottom plate 23, and spacer members 24, all connected by welding, as shown in Fig. 4. It will be readily apparent that the the fulcrum bracket assembly 21 may also be integrally formed by casting or welding. Bushings 25 in the members 22 and 23 rotatably support the pivot pin 17 with the fulcrum lever 15 being accommodated for pivotal movement intermediate the members 22 and 23. Bolt 29 in lug 30 serves to retain the pivot pin 17 in position. Wear plate and supporting bracket assemblies 31 and 32 are provided for supporting fulcrum lever 15.

Referring now to Figs. 2 and 4, it will be seen that the fulcrum bracket assembly 21 is arranged between shear blocks 36 and 37 on side frame 2 and is removably secured to the top surface of the side frame member 2 by four symmetrically arranged cap screws or studs 26. It will also be readily seen that the bushings 25 and the pivot pin 17 are offset from the center line of the fulcrum bracket assembly 21. Thus, as shown in Fig. 2, the fulcrum point 17 is located outside of the center line 33 of the journals 4 and of the side frame 2. It will now be readily seen that by removing the studs 26 and turning the fulcrum bracket 21 end for end 180° horizontally, and then reassembling the studs 26, as shown in Fig. 3, the fulcrum point 17 is moved to the inside of the center line 33 of the journals and of the side frame member 2. By comparing Figs. 2 and 3, it will be readily seen that this reversal of the fulcrum bracket assembly 21 changes the distance from the point of connection of the fulcrum lever 15 with the live lever 13 to the fulcrum point 17. Thus, the braking effort may be changed by merely reversing the fulcrum bracket assembly 21 and by substituting a different fulcrum lever, shown in Fig. 3 as 15a, having a differently located fulcrum point. Thus, for converting from passenger to freight service and vice versa, the entire unit brake rigging is the same, with the exception of the fulcrum lever.

It will also be readily apparent that this improved construction providing a removably mounted fulcrum bracket assembly permits ready replacement of the bushings 25, since the complete bracket assembly 21 can be removed from the truck side frame 2 and the bushings exchanged as a bench operation in the shop. A further advantage is the elimination of clearance holes under the fulcrum point to permit removal of bushings, as found in the conventional construction.

While I have illustrated and described a particular embodiment of this invention, further modifications and improvements will occur to those skilled in the art. I desire it to be understood, therefore, that this invention is not limited to the particular embodiment shown, and I intend in the appended claims to cover all modifications which do not depart from the spirit and scope of this invention.

What I claim as new and desire to secure by Letters Patent of the United States is:

1. In a rail vehicle truck having brake rigging associated therewith, a side frame member, a fulcrum bracket removably mounted on said side frame member and having a fulcrum point adapted to pivotally mount a brake rigging actuating fulcrum lever, and means for securing said fulcrum bracket to said side frame member in either a first position or a second position, said fulcrum point being offset from the longitudinal center line of said bracket, said fulcrum point being offset on one side of the longitudinal center line of said side frame in said first bracket position and on the other side of said side frame center line in said second bracket position whereby removal of said fulcrum bracket from one of its positions to the other of its positions is adapted to change the distance from the point of connection between said brake rigging and said fulcrum lever to said fulcrum point.

2. In a rail vehicle truck having brake rigging associated therewith, a side frame member, a fulcrum bracket removably mounted on the top of said side frame member having a fulcrum point adapted to pivotally mount a brake rigging actuating fulcrum lever, and means for securing said fulcrum bracket to said side frame member in either a first position or a second position, said fulcrum point being offset from the longitudinal center line of said bracket, said fulcrum point being offset on one side of the longitudinal center line of said side frame member in said first bracket position and on the other side of said side frame center line in said second bracket position whereby removal of said fulcrum bracket from one of its positions to the other of its positions is adapted to change the distance from the point of connection between said brake rigging and said fulcrum lever to said fulcrum point.

3. In a rail vehicle truck having a side frame member and brake rigging associated therewith, a fulcrum bracket removably mounted on said side frame member and having a fulcrum point adapted to pivotally mount a brake rigging actuating fulcrum lever, and means for securing said fulcrum bracket to said side frame member in either a first position or a second position, said fulcrum point having a first distance from the point of connection of said brake rigging with said fulcrum lever in said first bracket position and a second distance therefrom in said second bracket position whereby removal of said fulcrum bracket from one of its positions to the other of its positions is adapted to change the distance from the point of connection of said brake rigging with said fulcrum lever to said fulcrum point.

4. In a rail vehicle truck having brake rigging associated therewith, a side frame member, and a fulcrum bracket removably mounted on said side frame member and having a fulcrum point adapted to pivotally mount a brake rigging actuating fulcrum lever, said fulcrum bracket being adapted to be supported in a first position with said fulcrum point offset on one side of the longitudinal center line of said side frame member or in a second position with said fulcrum point offset on the other side of said center line whereby reversal of said fulcrum bracket is adapted to change the distance from the point of connection between said brake rigging and said fulcrum lever to said fulcrum point.

GERALD B. HUNT.

References Cited in the file of this patent

UNITED STATES PATENTS

| Number | Name | Date |
|---|---|---|
| 260,839 | Cameron | July 11, 1882 |
| 1,969,159 | Simanek | Aug. 7, 1934 |
| 2,286,517 | Tack | June 16, 1942 |
| 2,382,552 | Eksergian et al. | Aug. 14, 1945 |